United States Patent [19]
Kawano et al.

[11] Patent Number: 5,475,050
[45] Date of Patent: Dec. 12, 1995

[54] FROSTING AGENT FOR USE WITH AQUEOUS POLYURETHANE AND METHOD FOR PRODUCING THE SAME

[75] Inventors: Nagahiro Kawano; Kiyoshi Ezaki, both of Fukuoka; Yasushi Morinaka; Hiroyuki Inoue, both of Osaka, all of Japan

[73] Assignee: Moon-Star Chemical Corporation, Japan

[21] Appl. No.: 159,695

[22] Filed: Dec. 1, 1993

Related U.S. Application Data

[62] Division of Ser. No. 920,550, filed as a PCT/JP91/01522, Nov. 1, 1991, abandoned.

[30] Foreign Application Priority Data

Nov. 29, 1990 [JP] Japan .................................. 2-334741

[51] Int. Cl.⁶ .............................. C08K 9/00; B32B 5/16
[52] U.S. Cl. ........................ 524/493; 428/405; 428/406; 428/407; 428/447; 524/591; 524/847
[58] Field of Search ...................... 428/405, 406, 428/407, 447, 323, 331; 524/493, 847, 591, 442

[56] References Cited

U.S. PATENT DOCUMENTS

| | | | |
|---|---|---|---|
| 4,436,881 | 3/1984 | Laitar | 525/504 |
| 4,482,656 | 11/1984 | Nguyei et al. | 523/212 |
| 4,660,642 | 4/1987 | Young | 428/405 X |

*Primary Examiner*—D. S. Nakarani
*Assistant Examiner*—H. Thi Le
*Attorney, Agent, or Firm*—Wenderoth, Lind & Ponack

[57] ABSTRACT

A frosting agent in which particulate silica suspends with high dispersibility without lowering the flow-out and formability of an aqueous polyurethane as a binder of frosting coating agent. Such a frosting agent for use in an aqueous polyurethane is obtained by adding 0.5–5.0 parts by weight of γ-ureidopropyltriethoxysilane and 0.1 part by weight or more of water to 100 parts by weight of particulate silica and reacting said substances at a temperature of 15°–100° C. to modify the surface of said particulate silica. By this reaction, γ-ureidopropylsilane liberated by hydrolysis of ethoxysilane groups reacts with acid hydroxy groups. Thus, the wettability and compatibility of the frosting agent with respect to aqueous polyurethane increases. This improves the dispersibility and the resistance to scuff of the coating.

1 Claim, No Drawings

FROSTING AGENT FOR USE WITH AQUEOUS POLYURETHANE AND METHOD FOR PRODUCING THE SAME

This application is a Divisional of now abandoned application, Ser. No. 07/920,550, filed filed as a PCT/JP91/01522, Nov. 1, 1991, now abandoned.

TECHNICAL FIELD

This invention relates to a frosting agent to be added as a frosting component to an aqueous polyurethane coating material and a method for producing the same.

BACKGROUND ART

To produce a frosted coating made of aqueous (water-soluble type or water-dispersed type) polyurethane, it was ordinary practice to:add a silica frosting agent suspended in water to polyurethane, apply it to the surface of an article such as a glass bottle, and let it dry and cure.

In this case, in the suspension comprising water and a silica frosting agent, the latter settles with time, which may cause phase separation. In order to prevent this problem, it was necessary to add a commercially available thickening agent or surface-active agent.

But if a thickening agent or surface-active agent is added in an amount sufficient to prevent the separation and settling of the silica frosting agent in the suspension, the aqueous polyurethane itself will thicken. This lowers its flow and formability as a coating agent. On the other hand, if the use of a thickening agent and surface-active agent is restricted, the silica frosting agent will aggregate in the polyurethane, thus lowering the physical properties of the coating such as resistance to scuff.

An object of this invention is to provide a frosting agent in which fine particles of silica are suspended in an aqueous solvent in a suitable manner, which obviates the above problems, which does not lower the flow and formability of the aqueous polyurethane as a binder nor the resistance to scuff of the coating.

DISCLOSURE OF THE INVENTION

According to this invention, the frosting agent for an aqueous polyurethane comprises fine particles of silica having their surfaces modified with γ-ureidopropyltriethoxysilane.

The frosting agent for use with an aqueous polyurethane is produced by adding 0.5–3.0 parts by weight of γ-ureidopropyltriethoxysilane and 0.1 part or more by weight of water to 100 parts by weight of particulate silica and reacting it under temperature conditions of 15°–100° C.

The frosting agent for an aqueous polyurethane according to the present invention has a good compatibility and high wettability with an aqueous polyurethane resin. This is because γ-ureidopropyl silanol radicals which are liberated by the hydrolysis of ethoxysilane groups react with acidic hydroxyl groups on the surface of silica and modify the surface. When added to an aqueous polyurethane, the frosting agent is dispersed uniformly due to a uniform three-dimensional repulsion effect and stabilizes without re-aggregating. Even after the aqueous polyurethane resin hardens, the frosting agent is kept dispersed uniformly, so that its resistance to scuff is improved.

The particulate silica according to this invention is obtained with the wet process from water-containing silicic acid ($SiO_2.2H_2O$) or silicic anhydride having a bulk specific gravity (according to JIS K6223) of 0.3 g/ml or less and an average particle diameter (measured by transmitting light) of 4.5 microns or less.

γ-ureidopropyltriethoxysilane is a compound expressed by the formula $NH_2CONHC_3H_6Si(OC_2H_5)_3$. It is a low-odor liquid having a molecular weight of 264, solubility in water of 5% or less and a melting point of 0°–10° C. and is viscous and crystal clear at normal temperatures. In reacting γ-ureidopropyltriethoxysilane with the particulate silica, the acidic hydroxyl groups of the latter are used. The Hydrophilic-Lypophilic Balance (hereinafter HLB) value of the aqueous polyurethane is equal to that of the former. The products of reaction between the silica and γ-ureidopropyltriethoxysilane on the particulate silica surface include those expressed by the following formulas (I)–(III).

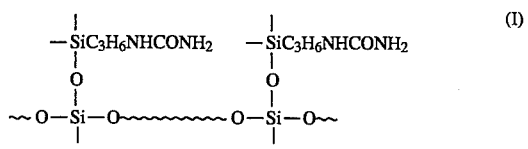

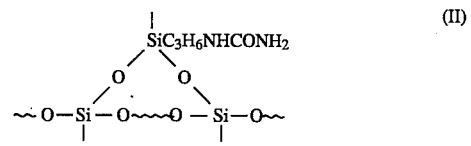

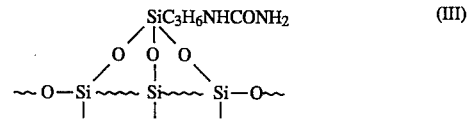

Also condensation products of γ-ureidopropyltriethoxysilane include

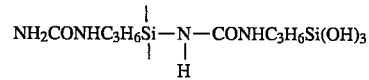

or

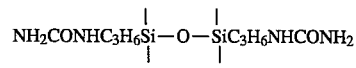

0.5–3.0 parts by weight of γ-ureidopropyltriethoxysilane should be added to 100 parts by weight of particulate silica. If less than 0.5 parts by weight, it is apparently insufficient in view of the number of silanol groups per unit surface area of silica and from the results of experiments. If more than 3.0 parts by weight, it is too much to be practical. In order to prevent the frosting agent from settling:, the addition rate is preferably about 2.0 parts by weight.

According to this invention, water is used as a solvent for the particulate silica and γ-ureidopropyltriethoxysilane or for hydrolysis of γ-ureidopropyltriethoxysilane and should be added in the amount of 0.1 part by weight or more Isopropyl Alcohol can be used as a solvent instead of water. But, in such a case, if its addition amount is less than 0.1 part by weight, γ-ureidopropyltriethoxysilane added in a predetermined amount cannot be hydrolyzed sufficiently and the surface of the silica cannot be modified sufficiently. If water is used as the solvent, the total addition amount of water including the water for hydrolysis should be determined so that the reaction speed will not drop. For example, 400–500 parts by weight of water may be added.

The modifying reaction which occurs simultaneously with hydrolysis should be carried out at a temperature of 15°–100° C. This is because it is preferable as a reaction condition to carry out the reflux at the boiling point (100° C.) of water used as the solvent or for hydrolysis or at the boiling point of isopropyl alcohol (82.4° C.) and further such a reaction can occur even at normal temperatures (15°– 25° C.).

The particulate silica thus made may be dehydrated or dried to form a powdery frosting agent. But of course it may be a slurry frosting agent containing water.

The frosting agent having the above structure and made as described above is formed by modifying the surface of the particulate silica with γ-ureidopropyltriethoxysilane Thus, it can be dispersed uniformly in the aqueous polyurethane without re-aggregating and settling and without the fear of thickening the aqueous polyurethane itself. Thus by adding such a frosting agent, the aqueous polyurethane coating agent will show an improved flow, formability and wettability with a glass surface. Also, the dry coating thus obtained will have improved resistance to scuff. Thus its industrial utility is high.

Other features will be described with reference to preferred embodiments.

BEST MODE FOR CARRYING OUT THE INVENTION

EXAMPLES 1–3

Five agitating type reaction tanks were prepared each containing 100 parts by weight of silica frosting agent (made by NIPPON SILICA INDUSTRIAL CO., LTD.: NIPPSIL E200A). Also, three separate vessels were prepared each containing 450 parts by weight of isopropyl alcohol. Then γ-ureidopropyltriethoxysilane was added in the amounts of 0.5, 2.0 and 3.0 parts by weight into the respective vessels. They were then agitated. The liquid thus obtained was put in the reaction tanks. Then 50 parts by weight of water for hydrolysis was put in each tank while rotating its agitating vanes at a high speed of 1000–2000 rpm. The substances in the tanks were heated and reacted under reflux at 83° C. (boiling point) for one hour. After removing isopropyl alcohol by simple distillation, they are dried at 120° C. for one hour. Three kinds of frosting agents were thus obtained.

EXAMPLES 4–6

Frosting agents were prepared in exactly the same manner as in the Examples 1–3 except that water was used instead of isopropyl alcohol.

COMPARATIVE EXAMPLES 1 and 2

Frosting agents were prepared in exactly the same manner as in the Example 1 except that γ-ureidopropyltriethoxysilane added in the amounts of 0.3 and 3.5 parts by weight.

COMPARATIVE EXAMPLE 3

3.5 parts by weight of thickening agent (KAO CORP.: VISSURF 1400) and 1.0 part by weight of surface-active agent (KAO CORP.: EMANON 4110) were added to 100 parts by weight of silica frosting agent (NIPPON SILICA INDUSTRIAL CO., LTD.: NIPPSIL E200A) and mixed together to form a suspension of a frosting agent.

The Examples 1–6 and comparative examples 1 and 2 were added to an aqueous polyurethane to form suspensions with a silica content of 20%. In the following tests, their settling properties, wettability with a glass surface and the resistance to scuff of the cured coatings were evaluated. The results are shown in Table 1.

(1) Settling Properties

The Specimens adjusted to 20 cps/R.T (about 25° C.) were put in 100 cc beakers. After leaving them for three days, the degree of settling properties was observed. The results are shown in three stages. ○ indicates that no settling was observed, Δ indicates that slight settling was observed, and X shows that the solid content has settled almost completely.

(2) Wettability

Liquid coating agents each comprising 28 parts by weight of each of the above-mentioned suspensions, 100 parts by weight of aqueous polyurethane (ASAHI DENKA KOGYO K.K.: USX-232, solid content: 30%) and 10 parts by weight of aqueous melamine resin (ASAHI DENKA KOGYO K.K.: HUX-11W) were applied to beverage bottles which, were rotating horizontally (750 ml in volume, thickness of 30-micron meter after crosslinking). The bottles were then dried for 10 minutes at 100° C. The wettability with the bottle surface and surface unevenness (or smoothness) were observed. The results are shown in three stages. ○ indicates that both the wettability and surface smoothness are good, Δ indicates that one of the two items is no good, and X indicates neither of the two items are good.

(3) Resistance to Scuff

After the wettability test, the bottles were heated for 30 minutes at 150 C. to complete crosslinking to provide a plurality of bottles having their surfaces frosted. These bottles were put in corrugated cardboard boxes (41.5 cm long, 51.5 cm across and 22.7 cm in height) each partitioned into 12 cells and capable of accommodating 12 bottles so that their sides will not touch each other. The boxes were then vibrated at an acceleration of 1 G, amplitude 25.4 mm and number of frequency of 270/min. for 30 minutes. This is a typical condition when the boxes are transported in a truck on a paved road for a distance of 250 km. The condition of the bottle surfaces was evaluated in three stages. ○ indicates that the frost on the surface did not disappear at all. Δ indicates that the frost has disappeared slightly. X indicates that 3 mm-wide frost-missing portions were observed on the side of the bottle.

TABLE 1

| | No. | | | | | | | | |
|---|---|---|---|---|---|---|---|---|---|
| | Example | | | | | | Comparative Example | | |
| Item | 1 | 2 | 3 | 4 | 5 | 6 | 1 | 2 | 3 |
| Settling property | ○ | ○ | ○ | ○ | ○ | ○ | Δ | Δ | Δ |
| Wettability | ○ | ○ | ○ | ○ | ○ | ○ | Δ | ○ | X |
| Resistance to scuff | ○ | ○ | ○ | ○ | ○ | ○ | Δ | ○ | X |

As will be apparent from the results shown in Table 1, the Examples 1–6 which comprise 100 parts by weight of particulate silica and 0.5–3.0 parts by weight of γ-ureidopropyltriethoxysilane and water showed good settling properties, wettability and resistance to scuff. In contrast, the comparative examples 1–3 which contain γ-ureidopropyltriethoxysilane in a ratio out of the above-described range showed poor results in settling properties. Also, the comparative example 3 which contains a thickening agent and a surface-active agent without modification of the silica surface showed extremely bad wettability and resistance to scuff.

INDUSTRIAL APPLICATION

The frosting agent according to this invention for use in an aqueous polyurethane is added as a frosting ingredient to a frosting coating agent used to provide surface protection and decoration of a formed article such as a bottle or of any other shape and material. Such a frosting agent for use in an aqueous polyurethane is dehydrated or dried into a powder form or used in the form of slurry containing water,

We claim:

1. A composition for coating a glass bottle to provide a frosted appearance on the surface of said glass bottle, said composition comprising an aqueous polyurethane and a frosting agent suspended in said aqueous polyurethane, said frosting agent comprising a particulate silica having its surface modified with γ-ureidopropyltriethoxysilane, the weight ratio of said γ-ureidopropyltriethoxysilane to said particulate silica being 0.5 to 3.0 parts per hundred parts by weight of particulate silica.

* * * * *